United States Patent
Liu et al.

(10) Patent No.: US 8,904,530 B2
(45) Date of Patent: Dec. 2, 2014

(54) SYSTEM AND METHOD FOR DETECTING REMOTELY CONTROLLED E-MAIL SPAM HOSTS

(75) Inventors: Danielle Liu, Morganville, NJ (US); Willa Ehrlich, Highland Park, NJ (US); David Hoeflin, Middletown, NJ (US); Anestis Karasaridis, Oceanport, NJ (US); Daniel Hurley, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 849 days.

(21) Appl. No.: 12/341,609

(22) Filed: Dec. 22, 2008

(65) Prior Publication Data

US 2010/0162396 A1 Jun. 24, 2010

(51) Int. Cl.
- G06F 21/00 (2013.01)
- H04L 29/06 (2006.01)
- G06F 21/56 (2013.01)
- H04L 12/58 (2006.01)

(52) U.S. Cl.
CPC ........ H04L 63/1441 (2013.01); H04L 63/1425 (2013.01); *H04L 12/585* (2013.01); G06F 21/566 (2013.01); H04L 63/1416 (2013.01); *G06F 2221/2101* (2013.01); *H04L 2463/144* (2013.01)
USPC ................. 726/23; 709/206; 709/224; 726/2; 726/13; 726/22

(58) Field of Classification Search
CPC .......... G06F 21/554; G06F 2221/2101; H04L 63/1466; H04L 63/1408; H04L 63/1425; H04L 63/1441; H04L 63/1416
USPC .......... 726/23, 13, 22; 709/206, 224
See application file for complete search history.

(56) References Cited

U.S. PATENT DOCUMENTS

| | | | | |
|---|---|---|---|---|
| 6,944,673 | B2 * | 9/2005 | Malan et al. | 709/237 |
| 7,712,134 | B1 * | 5/2010 | Nucci et al. | 726/23 |
| 7,769,873 | B1 * | 8/2010 | Mackie | 709/229 |
| 2002/0035698 | A1 * | 3/2002 | Malan et al. | 713/201 |
| 2005/0018608 | A1 * | 1/2005 | Wetherall et al. | 370/235 |

(Continued)

OTHER PUBLICATIONS

A. Karasaridis, et al., "Wide-Scale Botnet Detection and Characterization", Proceedings of the Workshop on Hot Topics in Understanding Botnets, Apr. 10, 2007.*

(Continued)

*Primary Examiner* — Mohammad A Siddiqi
(74) *Attorney, Agent, or Firm* — Wolff & Samson PC

(57) ABSTRACT

A system for detecting a remotely controlled e-mail spam host. The system includes an E-mail spammer detection unit and a host traffic profiling unit. The E-mail spammer detection unit identifies E-mail Spammers based on SMTP traffic characteristics. The host profiling unit extracts traffic components from the plurality of Internet traffic associated with an E-mail Spammer; interprets the extracted traffic components and determines whether the E-mail Spammer is a compromised host. The system may also include a botnet controller detection unit that analyzes traffic associated with compromised E-mail Spammers and identifies the botnet Controller remotely controlling the compromised E-mail Spammer.

18 Claims, 8 Drawing Sheets

(56) References Cited

U.S. PATENT DOCUMENTS

| | | | |
|---|---|---|---|
| 2005/0251570 A1 | 11/2005 | Heasman et al. | |
| 2007/0152854 A1* | 7/2007 | Copley | 341/51 |
| 2007/0226803 A1* | 9/2007 | Kim et al. | 726/24 |
| 2007/0282955 A1* | 12/2007 | Lin et al. | 709/206 |
| 2008/0028463 A1* | 1/2008 | Dagon et al. | 726/22 |
| 2008/0059588 A1 | 3/2008 | Ratliff et al. | |
| 2008/0080518 A1* | 4/2008 | Hoeflin et al. | 370/395.42 |
| 2008/0080558 A1 | 4/2008 | Wang et al. | |
| 2008/0307526 A1* | 12/2008 | Chung et al. | 726/23 |
| 2009/0300589 A1* | 12/2009 | Watters et al. | 717/140 |
| 2010/0095374 A1* | 4/2010 | Gillum et al. | 726/22 |

OTHER PUBLICATIONS

Y. Xie, et al., "Spamming Botnets: Signatures and Characteristics", SIGCOMM-08, 2008.

K. Xu, et al., "Profiling Internet Backbone Traffic: Behavior Models and Applications", SIGCOMM-05, 2005.

L. Zhuang, et al., "Characterizing Botnets from Email Spam Records", LEET 08: First USENIX Workshop on Large-Scale Exploits and Emergent Threats, 2008.

J. Stewart, "Inside the Storm: Protocols and Encryption of the Storm Botnet", Black Hat 2008 Presentation.

* cited by examiner

*FIG. 1*

| TRAFFIC COMPONENT | STANDARDIZED ENTROPY ASSOCIATED WITH LOCAL PROTOCOL PORT | SIGNIFICANT PORT VALUES | STANDARDIZED ENTROPY ASSOCIATED WITH REMOTE HOSTS | SIGNIFICANT REMOTE HOST VALUES | TRAFFIC COMPONENT STATISTICS | INTER-PRETATION |
|---|---|---|---|---|---|---|
| TCP Remote Port: 25 | 0.972 | N/A | 0.622 | N/A | outb: numflws: 1175@mean<br><br>bpf: 125167@stdev<br><br>bpf: 790929@coefvar<br><br>bpf:6.319%<br><br>inb: numflws: 945@mean<br><br>bpf: 7070.41@stddev<br><br>bpf: 26254.1@coefvar<br><br>bpf:3.713 | E-mail Client |
| | | | | | outb: numflws 1316.@mean<br><br>bpf:316.812 @stddev | |

FIG. 1(CONTINUED)

| | | | | | | |
|---|---|---|---|---|---|---|
| UDP Remote Port: 53 | 0 | UDP-53 | 0.788 | N/A | bpf: 487.294@ coefvar<br><br>bpf: 1.538%<br><br>inb: numflws: 1127@ mean<br><br>bpf: 1079.03@ stdev<br><br>bpf: 3160.07@ coefvar<br><br>bpf:2.929 | Host Interacting via Local Port UDP-53 with Remote Port UDP-53 |

FIG. 2

| E-mail Client Category | Host Traffic Profile Containing Non-Mail Related Traffic Possibly Indicative Of a Compromised Machine | Host Traffic Profile Containing Mail-Related Traffic Only |
|---|---|---|
| Black List E-mail Client | 60 | 190 |
| White List E-mail Client | 2 | 49 |

FIG. 3

| E-mail Client Category | Host Traffic Profile Containing Non-Mail Related Traffic Possibly Indicative Of a Compromised Machine | Host Traffic Profile Containing Mail-Related Traffic Only |
|---|---|---|
| Unknown E-mail Client Classified as Spammer | 50 | 200 |
| Unknown E-mail Client Classified as Legitimate | 14 | 236 |

FIG. 4

| E-mail Client Category | Host Traffic Profile Containing Non-Mail Related Traffic Possibly Indicative Of a Compromised Machine | Host Traffic Profile Containing Mail-Related Traffic Only |
|---|---|---|
| Black List E-mail Client | 60 | 190 |
| Unknown E-mail Client Classified as Legitimate | 50 | 200 |

FIG. 5

| TRAFFIC COMPONENT | STANDARDIZED ENTROPY ASSOCIATED WITH LOCAL PROTOCOL PORT | SIGNIFICANT PORT VALUES | STANDARDIZED ENTROPY ASSOCIATED WITH FOREIGN HOSTS | SIGNIFICANT FOREIGN HOST VALUES | TRAFFIC COMPONENT STATISTICS | INTERPRETATION |
|---|---|---|---|---|---|---|
| TCP Remote Port: 25 | 0.952 | N/A | 0.906 | N/A | outb: numflws: 149@mean bpf: 986.201@stdev bpf: 538.23@coefvar bpf:0.545761 | E-mail Client |
| UDP Remote Port: 11526 | 0 | UDP-63301 | 0 | 70.47.134.149 | outb: numflws: 325@mean bpf: 53@stddev bpf:0@coefvar bpf:0 | Host Performing P2P with Remote Host(s): 70.47.134.14 9 on Remote Port: 11526 using Local Port(s): UDP- 63301 |
| UDP Remote Port: 11543 | 0 | UDP-63301 | 0 | 71.255.108.159 | outb: numflws 325.@ bpf:53@mean @stddev bpf:0@coefvar bpf:0 | Host Performing P2P with Remote Host(s): 71.255.108.158 on Remote Port: 11526 using Local Port(s): UDP- 63301 |

FIG. 5 (CONTINUED)

| | | | | | |
|---|---|---|---|---|---|
| UDP Remote Port: 13580 | 0 | UDP-63301 | 0 | 73.228.240.101 | outb: numflws: 192@mean bpf:53@stddev bpf:0@coefvar bpf:0 | Host Performing P2P with Remote Host(s): 73.228.240.1 01 on Remote Port: 13580 using Local Port(s): UDP- 63301 |
| UDP Remote Port: 14228 | 0 | UDP-63301 | 0 | 70.82.127.95 | outb: numflws: 192@mean bpf:53@stddev bpf:0@coefvar bpf:0 | Host Performing P2P with Remote Host(s): 70.82.127.95 on Remote Port: 14228 using Local Port(s): UDP- 63301 |
| UDP Remote Port: 20176 | 0 | UDP-63301 | 0 | 26.129.142.252 | outb: numflws: 325@mean bpf:53@stddev bpf:0@coefvar bpf:0 | Host Performing P2P with Remote Host(s): 26.129.142.2 52 on Remote Port: 20176 using Local Port(s): UDP- 63301 |

FIG. 6

| 10.20.30.40 | Controller IP |
| --- | --- |
| 2522 | Controller Port |
| sm:25-6(11) | Trigger (Weight) |
| 10 | Number of Clients |
| 0.04 | Distance to Model |
| 8 | Number of Quasi-Periodic Clients |
| 0.7 | Heuristic Score |
| 7 | Number of triggers |
| 1 | Number of types of Clients |
| 2008/08/24 hr 03 | Start time of activity |
| 2008/08/26 hr 03 | End time of activity |
| 2008/08/26 hr 15 | Alarm time |
| 50 | Threshold |
| 123 | Overall score |

SYSTEM AND METHOD FOR DETECTING REMOTELY CONTROLLED E-MAIL SPAM HOSTS

FIELD

The disclosed technology relates to a system and method for detecting remotely controlled e-mail spam hosts, and more specifically, performing host traffic profiling to detect compromised e-mail spam hosts, with subsequent analysis to identify these compromised e-mail spam hosts' remote controllers.

BACKGROUND

E-mail spam, also known as unsolicited bulk E-mail or unsolicited commercial E-mail, is the practice of sending unwanted E-mail messages using Simple Mail Transfer Protocol (SMTP), frequently with commercial content in large quantities to an indiscriminate set of recipients.

Spammers sometimes employ compromised machines, called Botnet hosts (i.e., bots), to send spam email to target destination domains. A botnet or robot network is a group of computers running a computer application controlled and manipulated only by the owner or the software source. Usually the computers are infected with a malicious kind of robot software which present a security threat to unsuspecting computer owners. Once the robot software (also known as malicious software or malware) has been successfully installed in a computer, this computer becomes a zombie or a drone, unable to resist the commands of the bot commander.

A botnet may be small or large depending on the complexity and sophistication of the bots used. A large botnet may be composed of ten thousand individual zombies. A small botnet, on the other hand may be composed of only a thousand drones. Usually, the owners of the zombie computers do not know that their computers and their computers' resources are being remotely controlled and exploited by an individual or a group of malware runners through an Internet Relay Chat (IRC)

There are various types of malicious bots that have already infected and are continuing to infect the internet. Some bots have their own spreaders—the script that lets them infect other computers (this is the reason why some people dub botnets as computer viruses)—while some smaller types of bots do not have such capabilities.

A botnet's originator (aka "bot herder") can control the group remotely, usually through the IRC, and usually for nefarious purposes. Often the command-and-control takes place via an IRC server or a specific channel on a public IRC network. This server is known as the command-and-control server ("C&C"). Though rare, more experienced botnet operators program their own commanding protocols from scratch themselves. The constituents of these protocols include a server program, client program for operation, and the program that embeds itself on the victim's machine (bot). All three of these usually communicate with each other over a network using a unique encryption scheme for stealth and protection against detection or intrusion into the botnet network.

A bot typically runs hidden, and complies with the RFC 1459 (IRC) standard. Generally, the perpetrator of the botnet has compromised a series of systems using various tools (exploits, buffer overflows, as well as others; see also RPC). Newer bots can automatically scan their environment and propagate themselves using vulnerabilities and weak passwords. Generally, the more vulnerabilities a bot can scan and propagate through, the more valuable it becomes to a botnet controller community. The process of stealing computing resources as a result of a system being joined to a "botnet" is sometimes referred to as "scrumping."

Botnets have become a significant part of the Internet, albeit increasingly hidden. Due to most conventional IRC networks taking measures and blocking access to previously-hosted botnets, controllers must now find their own servers. Often, a botnet will include a variety of connections and network types. Sometimes a controller will hide an IRC server installation on an educational or corporate site where high-speed connections can support a large number of other bots.

A botnet can also be used to take advantage of an infected computer's TCP/IP's SOCKS proxy protocol for networking applications. After compromising a computer, the botnet commander can use the infected unit (a zombie) in conjunction with other zombies in his botnet (robot network) to harvest email addresses or to send massive amounts of spam or phishing mails.

When a botnet is used to send email spam, a botnet operator first sends out viruses or worms, infecting ordinary users' computers, whose payload is a malicious application—the bot. The bot then logs into a particular C&C server (often an IRC server, but, in some cases a web server) to receive instructions. A spammer purchases access to the botnet from the operator. The spammer then sends its instructions via the IRC server to the infected PCs causing them to send out spam messages to mail servers.

The botnet controller community features a constant and continuous struggle over who has the most bots, the highest overall bandwidth, and the most "high-quality" infected machines, like university, corporate, and even government machines.

Although Bots may also reside within a common address block (due to unclean networks) such hosts may not all submit E-mail spam at the same point in time so that not all address block members will be submitting E-mail spam at any instance in time.

Alternatively, E-mail spammers can also relay spam E-mail through a Spam Farm (i.e., hosts that are devoted solely to be sending E-mail spam). The Spam Farm utilizes Mail Transfer Agents (MTA) called open relays to accept responsibility for delivering E-mail from unauthenticated IP hosts. Thus, these open relays will themselves be able to be authenticated and authorized to submit mail by receiving MTAs. Additionally, a Spam Farm can have custom MTA software installed on their machines and initiate spam E-mail directly.

Spam Farmers may reside within a common address block and submit E-mail continuously with all Farmers participating in the submission. Thus, at any given time, all SMTP Clients within the address block will be submitting Spam E-mail at the same traffic volume. It is important to note that spam farmers are not involved in any other activities other than sending spam and are therefore much less of a security risk then a member of a Bot network.

Therefore, there is a need to distinguish E-mail Spammers that are not Botnet members (e.g., Spammer who are members of a Spam Farm) from E-mail Spammers that are Botnet members, for security purposes.

SUMMARY OF THE DISCLOSED TECHNOLOGY

In one embodiment, the present technology is directed towards a system that detects a remotely controlled e-mail spam host. The system may include an E-mail spammer detection unit and an E-mail spammer traffic profiling unit.

The E-mail spammer detection unit detects if a SMTP Client's initiated SMTP traffic is spam email (i.e., whether the SMTP Client is an E-mail Spammer).

The host traffic profiling unit, using a predefined algorithm, extracts "significant" traffic components from an E-mail Spammer's overall traffic where the e-mail spam host is a source IP address or a destination IP address, interprets the extracted traffic components and determines if the E-mail Spammer is a compromised e-mail spam host. The traffic components may be associated with mail-related activities and non-mail related activities, e.g., mail related activities may include Simple Mail Transfer Protocol (SMTP)-related interactions (tcp/25 and tcp/110 services), http-related services (tcp/80 and tcp/443) and DNS-related services (udp/53, tcp/53).

Alternatively, the host traffic profiling unit may detect that the spam email host consistently uses a particular User Datagram Protocol (UDP) local port with a specific payload byte size. This is an example of non-mail-related activities indicative of a compromised Spam Email Host participating in a Peer-to Peer Botnet Network.

The system may also include a Botnet controller detector. In use, the Botnet controller detector may extract flow records from the compromised e-mail spam host where compromised e-mail spam host is a source IP address or a destination IP address. A processor then analyzes the flow records for controller activity and assigns a confidence score based on the analysis. A comparator then compares the confidence score to the confidence threshold score. A botnet controller alarm is generated when the confidence score for the botnet controller exceeds the confidence threshold score.

BRIEF DESCRIPTION OF THE DRAWINGS

FIG. 1 is a table showing an example host traffic profile for a white listed E-mail client;

FIG. 2 is a table quantitating a number of E-Mail clients of a given type (i.e., White Listed vs. Black Listed) by a specific host traffic profile type given a set of SMTP Clients that were observed traversing monitored links during an arbitrary hour of day and day of week;

FIG. 3 is a table quantitating a number of unknown E-Mail clients classified by the E-mail Spammer detection unit as Spammer and a number of unknown E-Mail clients classified by the E-mail Spammer detection unit as legitimate by a specific host traffic profile type given a set of SMTP Clients that were observed traversing monitored links during an arbitrary hour of day and day of week;

FIG. 4 is a table quantitating a number of known black listed E-Mail clients vs. unknown E-mail clients classified as spammers by the E-mail Spammer detection unit by a specific host traffic profile type given a set of SMTP Clients that were observed traversing monitored links during an arbitrary hour of day and day of week;

FIG. 5 is a table showing an example host traffic profile for a STORM Bot E-mail Spammer participating in Peer-to-Peer interactions;

FIG. 6 is table showing an example alarm record generated by the botnet controller detector;

DETAILED DESCRIPTION

Figure 7:
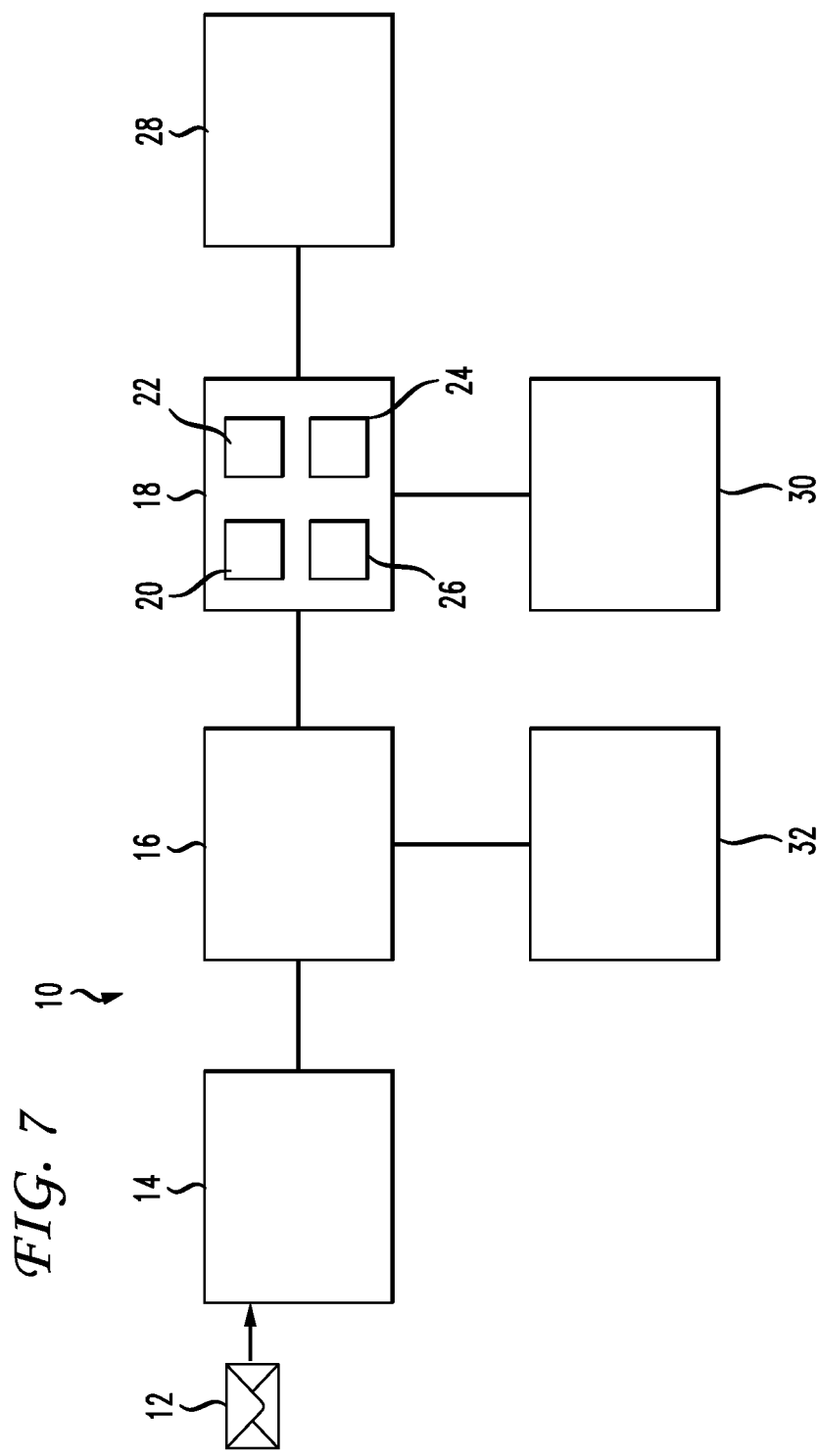
FIG. 7 is a block diagram showing a specific embodiment of the disclosed technology.

By performing host traffic profiling of Black Listed and classified E-Mail Spammers (classified as E-mail Spammers by an E-mail Spammer detection unit), E-mail Spammers who are compromised machines and therefore are likely members of Bot network can be identified. Once identified, other algorithms then can be applied to these Botnet hosts to uncover their Botnet Controller.

Host Traffic Profiling

A wide diversity of Internet Hosts, Internet Protocols, applications and services together with voluminous amounts of traffic traverse links in a large Internet Service Provider (ISP). To analyze these data, readily interpretable Internet host traffic profiles need to be constructed that will allow a SMTP Client's mail-related traffic components to be distinguished from the SMTP Client's non-mail-related traffic components. By quickly and concisely identifying significant traffic components (i.e., protocols, ports) for detected E-mail Spammers, we can identify whether there are any protocols or ports or patterns indicative of malware.

In order to construct the Internet host traffic profiles, an entropy-based significant traffic component extraction procedure was applied to flows collected for a given E-mail Client. The significant traffic component extracted may include, among other things, a) local port values; b) remote port values; c) protocol message values and d) protocol values.

When extracting a set of significant protocol port values, the probability distribution of values in general obeys a power law so that only relatively few values have significantly larger probabilities while the remaining values are close to being uniformly distributed.

The entropy-based significant traffic component extraction procedure was first applied to a set of flows associated with an Internet SMTP Client Host so as to extract a set of significant traffic components for local protocol ports. The procedure was then applied to the set of flows associated with an Internet SMTP Client Host to extract a set of significant traffic components for remote protocol ports.

As a metric of significance of a discrete random variable X, we use the normalized entropy which is defined as $$H_n(X) = -((\Sigma p(x_i) \log(p(x_i)))/(\log(\min(N_x, m))))$$

where $p(x_i)$ denote the probabilities of discrete values $x_i$, m is the sample size and $N_x$ is the number of all possible values of the discrete random variable.

The entropy-based clustering procedure started out with an initial threshold for selecting (local or remote) port numbers whose flow share≥an initial flow share threshold value (e.g., α parameter value set to 0.02). As long as the normalized entropy of the remaining (local or remote) port values≤threshold normalized entropy value indicative of a uniform distribution (e.g., β parameter value set of 0.85), the algorithm examines each non-clustered (local or remote) port value to determine whether its probability exceeds the flow share threshold value. If so, (the local or remote) port value is included in the set of significant port values. The algorithm reduces the flow share threshold value alpha by an exponentially decreasing factor, $2^{-k}$, following each iteration k. The procedure terminates when the remaining non-clustered (local or remote) port values have a probability distribution that is approximately uniform ($H_n$>B). (Please note, different flow share initial threshold values (i.e., α); different entropy threshold values approximating a uniform distribution (i.e., β) and different time periods for flow data collection can be implemented.)

To interpret an E-mail Client's significant traffic components, an E-mail Client's set of flows that share the same protocol port value are analyzed and the normalized entropy, $H_n$ is computed for the two remaining free dimensions. Thus, if an E-mail client has a significant local port value, then conditioned on that local port value, the normalized entropy is computed on the set of remote hosts and then on the set of remote ports. If the E-mail Client has a significant remote port value, then conditioned on the remote port value, the normalized entropy is computed on the set of remote hosts and then on the set of local ports.

To facilitate interpretation of a host's traffic component, the number of flows (numflws); the mean bytes per flow (mean bpf); the standard deviation in bytes per flow (stddev bpf) and the coefficient of variation in the bytes per flow (coefvar bpf) for inbound (inb) vs. outbound (outb) flows associated with a SMTP Client are examined.

An example of Host Traffic Profile computed for a White Listed E-mail Client is given in FIG. 1. (A white list is a list of "from" e-mail addresses that a mail server is configured to accept as incoming mail. Conversely, a black list is a list of e-mail addresses of known spammers.) The profile indicates that the E-mail Client initiates SMTP interactions with remote hosts (i.e., on remote TCP port 25) and that it also initiates Domain Name System (DNS) interactions with remote hosts (i.e., on remote UDP port 53) using local UDP port 53.

Host traffic profiles were also computed for Known Black Listed Clients, Unknown Clients classified as spammers by an E-mail Spammer detection device, and Unknown Clients classified as legitimate E-mail senders by an E-mail Spammer detection device. Specifically, these three client types were identified based on SMTP traffic traversing monitored links during an arbitrary hour of day and day of week. (N=250 E-mail Clients were randomly selected for each of the three categories.)

Additional flows (but not necessarily SMTP flows) for the same day of week and time of day for these 750 E-mail Clients for the purpose of traffic profiling these SMTP Clients were also collected. Due to resource limitations, links were prioritized with respect to the total amount of traffic carried and then terminated flow data collection upon reaching 50% of the traffic flows.

Preliminary analysis of the host traffic profiles constructed for 51 detected White Listed SMTP Clients indicated that these well-known E-mail Clients exhibited or utilized http-related services (e.g., TCP 80; TCP 443) and/or DNS-related (i.e., UDP 53; TCP 53) services, in addition to SMTP-related (TCP 25; TCP 110) services.

FIG. 2 presents the number of (known) Black Listed vs. White Listed E-mail Clients with host traffic profiles containing non-mail-related traffic vs. the number of E-mail Clients whose host traffic profiles contained mail-related traffic only. FIG. 3 presents a similar comparison for Unknown E-mail Clients classified as Spammer vs. Legitimate by an E-mail Spammer detection algorithm. FIG. 4 presents an analysis of (known) Black Listed E-mail Clients vs. Unknown E-mail Clients classified as Spammer by an E-mail Spammer detection algorithm. Http-related services and DNS-related services are possible services that a non-compromised E-mail Host might be offering or utilizing (in addition to SMTP-related services). These services will be named mail-related services for the disclosed technology. In contrast, all other services are deemed non-mail-related services and are indicative of a possibly compromised E-mail Sender Host.

The odds ratio:

$$R = \frac{\frac{p_{11}}{p_{12}}}{\frac{p_{21}}{p_{22}}} = \frac{\frac{n_{11}}{n_{12}}}{\frac{n_{21}}{n_{22}}}$$

(i.e., the odds of non-mail-related traffic (possibly signifying a compromised machine) occurring for one category of SMTP Clients divided by the odds of mail-related traffic only occurring for a second category of SMTP Clients) can be used to quantify the extent to which the occurrence of "possibly compromised" traffic behavior is associated with a type of SMTP Client.

An odds ratio of 1 implies that "possibly compromised" traffic behavior is independent of SMTP Client type. The odds ratio is 26.33 for FIG. 2 attesting to the fact that White-Listed SMTP Clients represent well-known and dedicated E-mail Hosts so that the likelihood of non-mail related traffic is much greater among Black Listed SMTP Clients as compared to the White List SMTP Clients. The odds ratio for FIG. 3 is 4.26 implying that "possibly compromised" traffic behavior is more likely for Unknown SMTP Clients classified as E-mail Spammers by an E-mail Spammer detection algorithm as compared to Unknown SMTP Clients classified as legitimate E-mail Clients by an E-mail Spammer detection algorithm. Finally, in FIG. 4, the odds ratio is 1.26 implying that "possibly compromised" traffic behavior is as likely among Black Listed SMTP Clients as among Unknown SMTP Clients classified as Spammers by an E-mail Spammer detection algorithm.

According, the above analysis shows that E-mail Spammers may manifest "other traffic components" in addition to SMTP-related, http-related or DNS-related activities with remote hosts. That is, an E-mail Spammer who offers non-mail related services to remote hosts, and/or who utilizes non-mail related services offered by remote hosts in addition to SMTP related, http-related and DNS-related services, is likely to be a compromised machine who may be remotely controlled by a Botnet Controller, while an E-mail Spammer that exhibits or utilizes SMTP-related, http-related or DNS-related activities only is likely to be a non-compromised machine.

Several E-mail Spammers exhibited a type of host traffic profile illustrated in FIG. 5. Thus, not only did the E-mail Spammer host initiate SMTP traffic to remote hosts on remote TCP Port 25, but, in addition, the Spammer manifested a very specific type of User Data Protocol ("UDP") interaction with selected remote hosts. The E-mail Spammer would interact with selected remote hosts on different UDP remote ports but always the same local UDP Port. This is consistent with, in some P2P networks, a host choosing an arbitrary local port (i.e., in FIG. 5, local UDP port 63301) to connect to a number of remote hosts with the number of distinct remote hosts equal to the number of distinct remote ports. (A Peer-to-peer, or P2P, is a communications model in which each party has the same capabilities as the other and either party can initiate a communication session. Other models with which it might be contrasted include the client/server model.)

Note too that these UDP (suspected P2P) interactions are always of the same size (53 bytes per flow given single packet flows). Packet analysis of a Storm Bot operating in a honeypot in our environment confirmed a pattern of single packet messages with payload size of 53 bytes. Consequently, FIG. 5 is therefore suggestive of a host traffic profile characteristic of a Storm Bot that sends both E-mail spam and utilizes P2P for command and control.

Consequently, non-mail related traffic components include P2P interactions and a SMTP Client identified as containing P2P traffic components by host traffic profiling would likely be a compromised host who may be remotely controlled by a Botnet Controller.

Detection of Botnet Controllers

The detection of E-mail Spammers that are compromised machines represent trigger events for further analysis of such hosts as Botnet members. Many botnets, including those based on the Internet Relay Chat (IRC) protocol, manifest centralized control architectures. That is, an attacker establishes an IRC channel where compromised hosts connect and listen for commands. Another host managed by the attacker then connects to the same channel and issues commands that are executed by the bots. This is a centralized flat model where all bots connect to the controller.

To identify centralized botnets, such as ones based on the IRC and HTTP protocols, a flow-based algorithm may be used. In the current context, the algorithm is applied as follows:

For a given time period, a set of known spammer host are identified using the technology disclosed above. If the spammer's IP address is either the source IP address or the destination IP address the flow records associated with that host are obtained. (Links may be prioritized with respect to their likelihood of carrying such traffic in order to increase the efficiency of the data collection in light of the large number of links carrying traffic into and out of a network.)

These flow records are analyzed to identify suspected Controller activity. Specifically, parse flows to identify bot-controller connections indicative of command and control (C&C) between the spam hosts and other remote hosts. A remote host/port pair that is associated with multiple local IPs that exhibits certain traffic characteristics indicative of command and control (e.g., packets per flow, bytes per packet, inter-arrival times between flows) constitute a bot controller address and control port.

Once identified each botnet controller is assigned a confidence score for each remote host/port pair based on factors such as number of suspected bot clients connected, C&C traffic characteristics, number of triggers, types of triggers and other heuristics. These scores are updated periodically. Alarms are generated whenever the confidence score exceeds a threshold.

FIG. 6 gives an example of a botnet alarm. This particular alarm identifies a host that is the controller of spamming hosts using known trojans, such as, Win32/Cutwail.gen!C trojan. The alarm indicates the IP address (anonymized) and the port of a suspect controller. The trigger type (sm: 25-6) indicates that the controller was discovered from spam hosts (using SMTP port 25/6) and that there were 11 spammer-hours (product of number of spammers and the number of hours that we detected such activity). Other metrics such as the numbers of suspect clients and quasi-periodic suspect clients, distance from traffic model, number of triggers and types of triggers are also indicated in the alarm, along with the period of the activity.

The alarm provides an overall confidence score that this a true positive. A value higher than 100 suggests that the host is highly suspect and requires further scrutiny. Even though we use other triggers to perform this analysis, this example indicates that this alert was generated using only spam host triggers. Therefore all spam hosts that connect to the suspect controller on the port indicated in the alarm are spam bots. This particular alarm pointed to an instance of the Win32/Cutwail.gen!C controller, that manages remotely compromised hosts, mainly responsible for spam campaigns.

In another implementation of the Botnet Controller Detector, Botnet Controller Command and Control (C&C) activity is specific to IRC and HTTP protocols so that C&C is centralized. In contrast, given botnets that utilize Peer-to-Peer (P2P) protocols for C&C, bots can receive from or issue commands to other bots. There could be multiple layers of hierarchy, as in the case of a Storm botnet. In a traditional P2P file sharing system, all hosts behave as clients and servers and are called "servants." Bots periodically connect to other servant bots in their peer lists in order to retrieve commands issued by an attacker. P2P bots typically open a service port to listen for incoming commands from other bots. Therefore, other implementations of the Botnet Controller Detector may include detection of Botnet Controllers that perform Peer-to-Peer C&C.

Specific Embodiment

FIG. 7 shows a specific embodiment of the disclosed technology. The system 10 may include an E-mail Spammer detection unit 16 and a host traffic profiler 18.

The E-mail Spammer detection unit 16 can be any device known in the art that can receive incoming mail initiated by an SMTP Client and classify the SMTP Client as an E-mail Spammer. For example, the E-mail Spammer detection device may be the E-mail Spammer device disclosed in U.S. patent application Ser. No. 12/342,167, filed Dec. 23, 2008, hereby incorporated by reference. This E-mail Spammer detection device involves an approach for email spammer detection based on traffic characteristics of Simple Mail Traffic Protocol (SMTP) initiated by SMTP Clients. The traffic characteristics are derivable from SMTP transport header data initiated by a plurality of E-mail Spammer and legitimate SMTP Clients.

The host traffic profiler 18 may include an extractor 24, a profile construction unit 26, a processor 20 and a storage device 22.

The extractor 24 may be an entropy-based significant traffic component extraction procedure. Entropy measures the observational variation in a set of values and is defined as follows For example, let X be a random variable that takes on $N_X$ discrete values. If we randomly sample or observe X m times, then $P(x_i)=m_i/m$, $x_i \in X$, where $m_i$ is the frequency of X taking the value $x_i$. Entropy of X is defined as $$H(X) = -\sum_{x_i \in X} p(x_i) \log(p(x_i)), \text{ where } 0 \leq H(X) \leq H_{max}(X) = \log(\min(N_x, m))$$

The normalized entropy provides a measure of variety of uniformity irrespective of sample or support size and is defined as $H(X)/H_{max}(X)$. If normalized entropy is 0, then all observations of X take the same value and so $p(x)=1$ for some $x \in X$. If normalized entropy is 1, then all observed values of X are different and unique and the observations have the greatest degree of variety or unpredictability.

The significant traffic component extracted by the extractor 24 may be sent to the profile construction unit 26. This unit 24 interprets the extracted traffic components and constructs a traffic profile for a detected E-mail Spammer. The traffic profile is then used by the processor 20.

The processor 20 controls the overall operation of the host traffic profiler 18 by executing computer program instructions which define an operation determining if an E-mail Spammer is a possibly compromised email host. The computer program instructions may be stored in the storage device 22, or other computer readable medium (e.g., magnetic disk, CD ROM, etc.), and loaded into processor 20 when execution of the computer program instructions is desired. Thus, some of the steps in FIG. 8 may be defined by the computer program instructions stored in the storage device 22 and controlled by the processor 20 executing the computer program instructions.

For example, the computer program instructions can be implemented as computer executable code programmed by one skilled in the art to perform an algorithm defined by the steps discussed below. Accordingly, by executing the computer program instructions, the processor 20 executes an algorithm defined by these steps.

The system 10 may also include one or more network interfaces for communicating with other devices via a network and may also include input/output devices (not shown) that enable user interaction with the computer (e.g., display, keyboard, mouse, speakers, buttons, etc.). One skilled in the art will recognize that an implementation of an actual computer could contain other components as well. These other devices may include a network mailbox 32, a botnet controller detector 30 and/or a spam processing unit 28.

Figure 8:
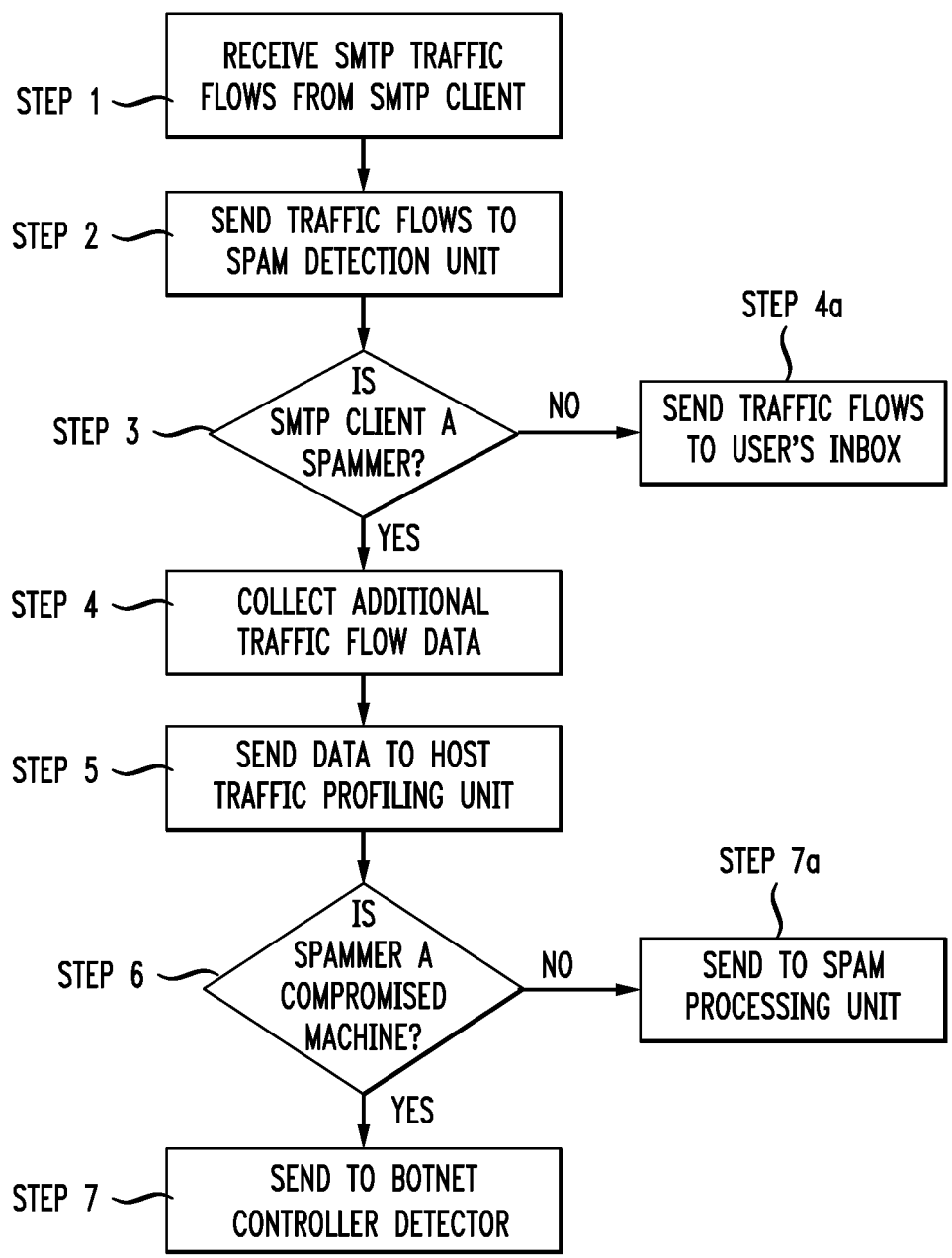
FIG. 8 is a flow chart implementing the specific embodiment of FIG. 7.

FIG. 8 is a flow chart implementing the system shown in FIG. 7.

A set of SMTP flows associated with an SMTP Client is received within some time period Unit 14 (Step 1). These network flows are analyzed to determine if the initiating SMTP Client is an E-mail Spammer or a legitimate SMTP Client via an E-mail Spammer detection unit 16 (Step 2).

If the SMTP Client is classified as a legitimate SMTP Client, then the SMTP flows are sent through normal routing procedures and will be sent to a user's inbox 32 (Step 4*a*).

If the SMTP client is classified as an Email Spammer, additional traffic flow data are collected (Step 4). The traffic flow data are subsequently analyzed by the host traffic profiler 18 (Step 5). The host traffic profiler 18 extracts traffic components from the plurality of network flows collected for the E-mail Spammer, constructs a traffic profile for the E-mail Spammer and then makes a determination whether the E-mail Spammer is a compromised machine. (Step 6).

If the SMTP Client is determined to be a non-compromised machine, then the SMTP flows may be quarantined and/or the SMTP Client may be black listed and/or deleted from the network 10 (Step 7*a*).

If the host traffic profiler decides the E-mail Spammer is a compromised machine, then the E-mail Spammer may be further analyzed to identify its remote Controller by a botnet controller detector 30 (Step 7). Once the botnet controller detector is determined and a Botnet Controller detected, the system 10 may implement actions to ensure that the botnet controller and/or its Botnet hosts are completely removed from the system and that the botnet network cannot and will not infiltrate the system 10 for malicious purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A system for detecting a remotely controlled e-mail spam host comprising:
   an e-mail spammer detection unit to analyze incoming network data received from an e-mail client to determine if the e-mail client is an e-mail spammer;
   a host traffic profiler unit comprising:
      an extractor to, in response to determining that the e-mail client is an e-mail spammer, extract traffic flow data from incoming internet traffic associated with the e-mail spammer, and to extract an entropy-based significant traffic component from the traffic flow data, the entropy-based significant traffic component comprising significant protocol port values determined by:
         clustering ports having a flow share greater than or equal to a threshold value, and
         determining the significant protocol port values as non-clustered ports having a probability exceeding the threshold value;
      a profile construction unit to construct a traffic profile associated with the e-mail spammer based on the traffic flow data and the entropy-based significant traffic component, wherein the traffic profile comprises data indicative of types of interactions and ports; and
      a processor to determine if the e-mail spammer is a compromised e-mail spammer based on the traffic profile; and
   a botnet controller detector: for identifying a botnet controller controlling the compromised e-mail spammer; for analyzing the traffic flow data to identify a botnet controller connection associated with the botnet controller; and for assigning a confidence score to the botnet controller based on analyzing the traffic flow data, wherein the confidence score is based on a number of suspected bot clients connected, bytes per packet, inter-arrival times between flows, a number of triggers, and types of triggers.

2. The system of claim 1, wherein the traffic flow data is associated with mail-related activities and non-mail related activities.

3. The system of claim 2, wherein the host traffic profiler unit further comprises:
   a detector that detects if the compromised e-mail spammer consistently uses a particular user data protocol port with a specific payload byte size indicating non-mail-related activity.

4. The system of claim 2, wherein mail-related activities include simple mail transfer protocol interactions, hypertext transfer protocol related services, and domain name system related services.

5. The system of claim 1, wherein the e-mail spammer detection unit detects if a simple mail transfer protocol client that initiates simple mail transfer protocol traffic is the e-mail spammer.

6. The system of claim 1, wherein the processor executes an algorithm to identify traffic flows associated with botnet controllers.

7. The system of claim 1, wherein:
   the extractor extracts the traffic flow data in response to a determination that an internet protocol address of the compromised e-mail spammer is one of a source internet protocol address and a destination internet protocol address;
   and wherein the botnet controller detector further comprises:
   a comparator that compares the confidence score to a confidence threshold score representing a numerical probability that the botnet controller is remotely controlling the compromised e-mail spammer; and
   a botnet controller alarm that generates an alarm in response to the confidence score exceeding the confidence threshold score.

8. The system of claim 1, wherein the entropy-based significant traffic component includes one of local port values, remote port values, protocol message values, and protocol values; and wherein the extractor interprets the entropy-based significant traffic component in order to construct the traffic profile.

9. The system of claim 1, wherein entropy of X is defined as $$H(X) = -\sum_{x_i \in X} p(x_i) \log(p(x_i)),$$

where $0 \leq H(X) \leq H_{max}(X) = \log(\min(N_x, m))$ wherein X is a random variable that takes on $N_x$ discrete values, and wherein if X is randomly sampled m times, then $P(x_i)=m_i/m$, $x_i \in X$, wherein $m_i$ is a frequency of X taking a value $x_i$.

10. The system of claim 1, wherein the entropy-based significant traffic component is determined based on a normalized entropy defined for a discrete random variable X as:

$$H_n(X) = -((\Sigma p(x_i) \log(p(x_i)))/(\log(\min(N_x, m))))$$

where $p(x_i)$ denotes probabilities of discrete values $x_i$, m is a sample size, and $N_x$ is a number of all possible values of the discrete random variable X.

11. A computer-implemented method for detecting a compromised e-mail spam host comprising:
  analyzing incoming network data received from an e-mail client to determine if the e-mail client is an e-mail spammer;
  in response to determining that the e-mail client is an e-mail spammer, extracting traffic flow data from incoming internet traffic associated with the e-mail spammer, and extracting an entropy-based significant traffic component from the traffic flow data to construct a traffic profile associated with the e-mail spammer, wherein the traffic profile comprises data indicative of types of interactions and ports, the entropy-based significant traffic component comprising significant protocol port values determined by:
    clustering ports having a flow share greater than or equal to a threshold value, and
    determining the significant protocol port values as non-clustered ports having a probability exceeding the threshold value;
  determining if the e-mail spammer is a compromised e-mail spammer based on the traffic profile;
  detecting if a botnet controller is remotely controlling the compromised e-mail spammer;
  analyzing the traffic flow data to identify a botnet controller connection associated with the botnet controller; and
  assigning a confidence score to the botnet controller based on the analyzing the traffic flow data, wherein the confidence score is based on a number of suspected bot clients connected, bytes per packet, inter-arrival times between flows, a number of triggers, and types of triggers.

12. The method of claim 11, wherein the traffic flow data is associated with mail-related activities and non-mail related activities.

13. The method of claim 12, wherein the mail-related activities include simple mail transfer protocol related services, hypertext transfer protocol related services, and domain name system related services.

14. The method of claim 11, further comprising:
  detecting if a simple mail transfer protocol client that initiates simple mail transfer protocol traffic is the e-mail spammer.

15. The method of claim 14 wherein the detecting if a simple mail transfer protocol client that initiates simple mail transfer protocol traffic is the e-mail spammer comprises:
  detecting if the compromised e-mail spammer consistently uses a particular user data protocol port with a specific payload byte size indicating non-mail-related activity.

16. The method of claim 11, wherein the detecting if a botnet controller detector is remotely controlling the compromised e-mail spammer further comprises:
  extracting the traffic flow data from the compromised e-mail spammer in response to a determination that an internet protocol address of the compromised e-mail spammer is one of a source internet protocol address and a destination internet protocol address;
  comparing the confidence score to a confidence threshold score representing a numerical probability that the botnet controller is remotely controlling the compromised e-mail spammer; and
  generating an alarm in response to the confidence score exceeding the confidence threshold score.

17. The method of claim 11, wherein the entropy-based significant traffic component includes one of local port values, remote port values, protocol message values, and protocol values, the method further comprising: and
  interpreting the entropy-based significant traffic component in order to construct the traffic profile.

18. The method of claim 11, wherein the entropy-based significant traffic component is determined based on a normalized entropy defined for a discrete random variable X as:

$$H_n(X) = -((\Sigma p(x_i) \log(p(x_i)))/(\log(\min(N_x, m))))$$

where $p(x_i)$ denotes probabilities of discrete values $x_i$, m is a sample size, and $N_x$ is a number of all possible values of the discrete random variable X.

* * * * *